Feb. 6, 1951     E. B. HALES     2,540,943
VISUAL SIGNAL TRANSLATOR

Filed Jan. 10, 1950     2 Sheets-Sheet 1

Inventor
EVERETT B. HALES
By
H. S. Mackey
Attorney

Feb. 6, 1951 E. B. HALES 2,540,943
VISUAL SIGNAL TRANSLATOR
Filed Jan. 10, 1950 2 Sheets-Sheet 2

Inventor
EVERETT B. HALES
By
Attorney

Patented Feb. 6, 1951

2,540,943

UNITED STATES PATENT OFFICE 2,540,943

VISUAL SIGNAL TRANSLATOR

Everett B. Hales, Mount Kisco, N. Y., assignor to General Precision Laboratory Incorporated, a corporation of New York Application January 10, 1950, Serial No. 137,705

8 Claims. (Cl. 315—9)

This invention relates to a visual signal translator wherein an image display derived from received or generated signals may be altered by having portions thereof eliminated or by adding material thereto.

In the ordinary transmission of visual signals through the medium of electrical impulses the display obtained at the point of reception is an exact reproduction of that transmitted. In many instances, however, it is extremely advantageous to vary the display normally transmitted or generated by adding to or subtracting from the display at the point of reception.

For example in target displays and radar training devices it is possible to simulate the position of targets on the screen of a cathode ray tube by selectively applying the proper deflection and intensification potentials to the elements of a cathode ray tube. Such a display, however, differs from the normal radar display obtained by the use of a moving search antenna in that all of the target positions are continuously seen. In the normal radar display obtained from signals transmitted and echoes received by a search antenna system only those target positions are displayed on the radar display screen which at any instant of time are in the path of reception of the search antenna, target positions successively appearing and disappearing as the search antenna is directed toward and away from the area in which they are located.

In order that a device may have practical utility in training personnel to operate such radar devices and interpret the information depicted thereby, it is essential that such training devices display no more information than would be depicted on an actual radar display screen. It is extremely advantageous, therefore, to be able to eliminate from a simulated radar display screen all target representations which are not, at any particular instant of time, in the path of a simulated radar beam and to illuminate the target representations successively over the screen area in the same manner as would be the case where a moving search antenna having a restricted area of reception were used.

Again in other applications it is desirable at various times to mask a portion of a received television picture to produce interesting montage and other special effects.

Likewise in still other applications it is of advantage to be able to add messages and other information to received television pictures or other displays, which information is of interest only to those viewing a particular display screen. For example, in various places where a television receiver is provided for the entertainment of a group the ability to control and introduce information, such as the accurate time, advertising messages and the like to the regular video signal received and depicted on the viewing screen is of particular merit.

As a corollary application it is also of the utmost advantage to be able when transmitting information in the form of visual signals to aircraft during landing approaches, etc., to be able to add to these signals special matter such as weather reports and the like.

Many other applications will occur to those skilled in the art as the invention is capable of wide application and use and the above examples are merely set forth as a brief indication of the many uses to which the invention may be put.

One purpose of the invention, therefore, is to provide an apparatus whereby generated or received video signals may be modified by subtracting portions therefrom.

Another purpose of the invention is to provide a simple yet effective mechanism whereby any desirable matter may be added to received or generated video signals.

These purposes are accomplished in general by the use of two cathode ray tubes, one of which acts as the main display tube and the other of which acts as an auxiliary display at which point material is added and/or subtracted. Both tubes have their deflecting circuits energized or at least synchronized from the same source so that the cathode ray beams developed by each are scanned over the tube screens in synchronism. The intensifying electrodes of the main display tube, however, are energized by a photocell circuit which circuit is in turn energized by the light image depicted on the screen of the auxiliary cathode ray tube. Thus by interposing a mask between the screen of the auxiliary tube and the photocell, which mask is formed with a transparent portion, only that portion of the screen of the main tube has a picture image impressed thereon which corresponds to the transparent area of the mask.

If a plan position indicator display is to be simulated, the auxiliary tube has its screen illuminated by all target positions so that to the eye illumination is continuous, and the mask is made in the form of one or more discs having a small transparent sector or another form of opening, at least one of the discs being revolved at a speed corresponding to the speed of rotation of a search antenna. The display on the main tube screen then appears as a small area, which may be radial, revolving about the face of the screen, the targets being depicted only when corresponding in position to the angular position and range of some point within the illuminated area.

When material is to be added to the final display such material may be opaquely marked directly on the face of the screen of the auxiliary tube or a transparent tape or other mask bearing opaque characters or characteristics may be advanced over the screen of the auxiliary tube between the tube and the photocell.

Of course opaque tape with transparent characters may also be employed but is not considered to be as desirable as transparent tape with opaque characters as more of the original image is observed in the latter case.

Better understanding of the invention can be secured by reference to the following detailed description together with the drawings in which.

Figure 1:
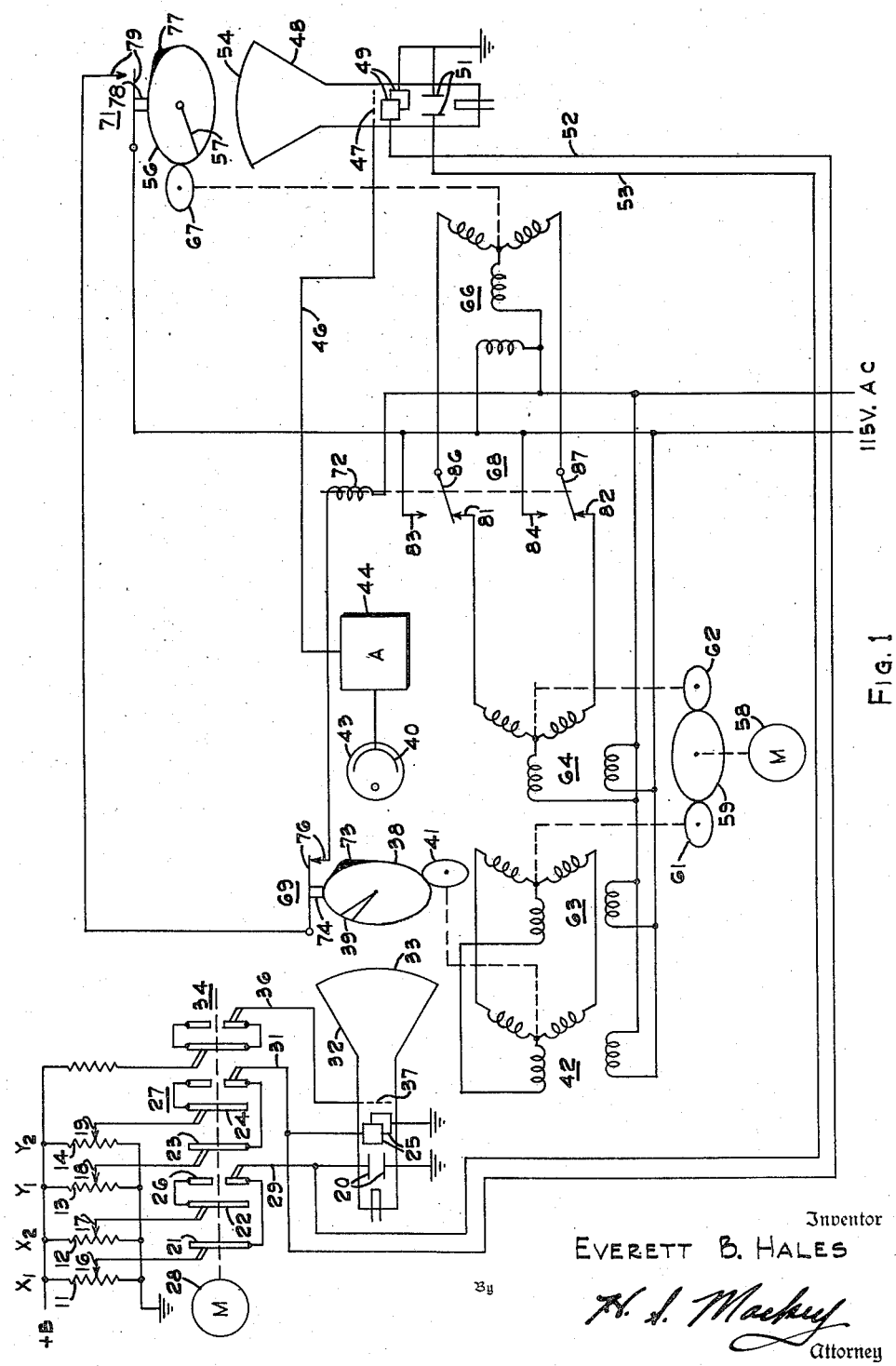
Figure 1 is a schematic illustration of one embodiment of the apparatus of the invention.

Referring now to Fig. 1, four voltage dividers 11, 12, 13 and 14 constitute a simple target position generator that produces rectangular coordinate voltages representing the positions of two targets in a plane. This target position generator can, of course, be enlarged to represent additional target positions up to a reasonable number simply by adding additional pairs of voltage dividers, but a representation of two target positions is sufficient to serve as an example. One end of each voltage divider is grounded, while the other end is connected to a potential source. The sliders 16, 17, 18 and 19 are connected through slip rings 21, 22, 23 and 24 to commutators 26 and 27 shown in developed form, driven by a motor 28, in order to place in turn on two common output bus bars 29 and 31 pairs of voltages representing X and Y coordinates of targets. These two conductors are connected to the horizontal and vertical deflection plates 29 and 25 respectively of a cathode ray tube 32, so that its cathode ray is successively deflected to positions on its screen 33 representing successive target positions. An additional commutator 34 energized by high positive potential and rotated by the motor 28 produces intensification pulses of proper phase and duration. These pulses are impressed on to an intensification electrode 37 of the cathode ray tube 32 through the conductor 36, with the result that illuminated spots are successively caused to appear on the screen 33, each representing the position of a target in a plane.

Figure 2:
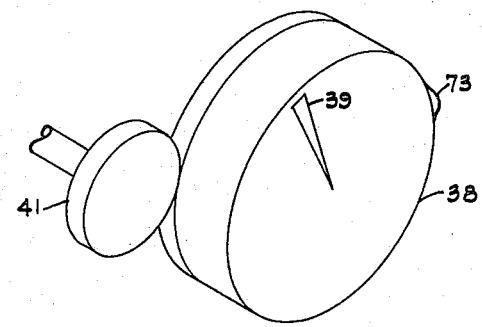
Figure 2 is a view of one embodiment of the mask required by the invention.

A disc or mask 38 having a transparent sector 39 is placed in front of the screen 33 and is geared through a pinion 41 for rotation by a synchro or self-synchronous motor 42. The mask 38 is shown in greater detail in Fig. 2. It is designed to simulate the scan of a radar antenna that rotates continuously and steadily. When this mask is rotated in front of the screen 33 it cuts off all light emanated by the screen target spots except in its transparent sector. A phototube 43 is placed so that it is illuminated by light received from the screen 33 through the transparent sector 39. When the cathode 40 of the phototube is thus illuminated, the internal resistance of the interelectrode space thereof is reduced and causes a potential change in the output circuit of the phototube 43 that is applied to cause intensification of the cathode ray of a second cathode ray tube 48. The function of the phototube 43 is to turn on the second cathode ray tube 48 when excited and to turn it off when not excited. Thus any illuminated target spot appearing in the open sector 39 excites the phototube, which turns on the second cathode ray tube during the time of excitation. The screen 33 has a very short persistence, so that the potential output of the phototube 43 is in the form of pulses, each lasting no longer than the time of ray illumination of the screen spot causing it. The speed of rotation of the mask 38 is made to be so slow relative to the commutator speed that each target spot is ray illuminated at least once during the time that it is uncovered by the transparent sector.

More specifically, it is at once apparent from the geometry of a disc with a transparent sector that the minimum cyclic frequency F of target display which will permit at least one illumination of each target spot while disclosed by a transparent sector of width $a$ in radians, when the mask speed is $\gamma$ revolutions per second, is $$F = \frac{2\pi\gamma}{a}$$

The output potential pulses of the phototube 43 are amplified in an amplifier 44, then are applied through a conductor 46 to the intensifying electrode 47 of the second cathode ray tube 48. The deflection electrodes 49 and 51 of this tube are actuated through conductors 52 and 53 from the same commutators 26 and 27 that actuate the deflection electrodes of the cathode ray tube 32, so that the ray deflections of the tube 48 are the same as those of the tube 32 and are synchronous therewith. The tube 48 is normally dark, but when intensifying pulses are applied to its intensifying electrode 47 from the phototube 43, target spots appear on its screen 54 at the positions determined by the charges on its deflection electrodes. Since these charges are the same as those on the electrodes of the tube 32, the same patterns will appear on the screen 54 as appear on the screen 33, except that only so much of the patterns appear on the screen 54 as are at the instant visible to the phototube 43 through the transparent sector 39. Since this sector rotates at a slow rate which may be four revolutions per minute, the pattern on the screen 54 is visible within a like sector appearing to rotate at a like speed of four revolutions per minute.

A cursor 56 is positioned in front of the screen 54 of the cathode ray tube 48. The cursor consists of a line 57 inscribed radially on a disc marked in azimuth degrees and having the diameter of the screen. The cursor is rotated at the rate of the rotating mask 38, and marks the leading edge of the rotating illuminated sector of the screen 54. Rotation of the cursor is accomplished by the use of a coarse and fine transmission system accurately synchronized to the rotation of the mask 38. The fine synchronization system is of the synchro-transmission type operated by a motor 58 geared through gears 59, 61 and 62 to two synchro generators 63 and 64. These generators drive synchro motors 42 and 66 which are geared to the mask 38 and cursor disc 56 respectively through pinions 41 and 67 which have 10:1 tooth ratios, so that the synchro speeds are 40 revolutions per minute and the mask and cursor speeds are 4 revolutions per minute. The mask and cursor are thus very accurately synchronized to the common driving motor 58 and to each other but have ten possible points of synchronization within the revolution, so that synchronization is ambiguous to this extent.

To overcome this ambiguity a coarse synchronization system is provided which consists of a relay 68, a mask switch 69 and a cursor switch 71. This coarse synchronization stops the cursor rotation until the instant when the continued rotation of the mask brings the two into approximate synchronization, when the cursor is released and thenceforth rotates in exact synchronism under control of the fine synchronizing system.

The operation of the coarse synchronization system is as follows: The relay 58 has an operating coil 72 connected through the normally-closed contact 76 of switch 69 and the normally-open contact 79 of switch 71 to a source of electrical power. The normally-closed switch 69 is mechanically opened for a brief period during each rotation of the mask 38 by a lug 73 thereon that engages a follower 74, forcing the contacts 76 apart. Also, the normally-open switch 71 is mechanically closed for a brief period during each rotation of the cursor 56 by a lug 77 thereon that engages a follower 78, forcing the contacts 79 to close. If both switches be operated simultaneously the circuit is not closed and the coil 72 is not energized at any time. This will be the case when the cursor rotates synchronously with the mask and when the switches are actuated simultaneously. The current to operate the cursor synchro 66 is conducted through the back contacts 81 and 82 of the relay 68, so that as long as the relay 68 is unoperated the synchro 66 is permitted to operate. If, however, the rotations of the cursor 56 and mask 38 are not in step, so that operations of the switches 69 and 71 occur at different times, the circuit of the coil 72 is closed and the forward contacts 83 and 84 of the relay 68 are contacted by the armatures 86 and 87. The connections to the synchro 66 three-part winding are broken and one of the three parts thereof in series with the other two parts in shunt is connected directly across the alternating current power supply, locking the synchro 66 immobile. It remains stationary until rotation of the mask 38 breaks the relay coil circuit at the switch 69, restoring power to the synchro 66 so that the cursor 56 again starts to turn, and rotates in phase with the mask 38.

Figure 3:
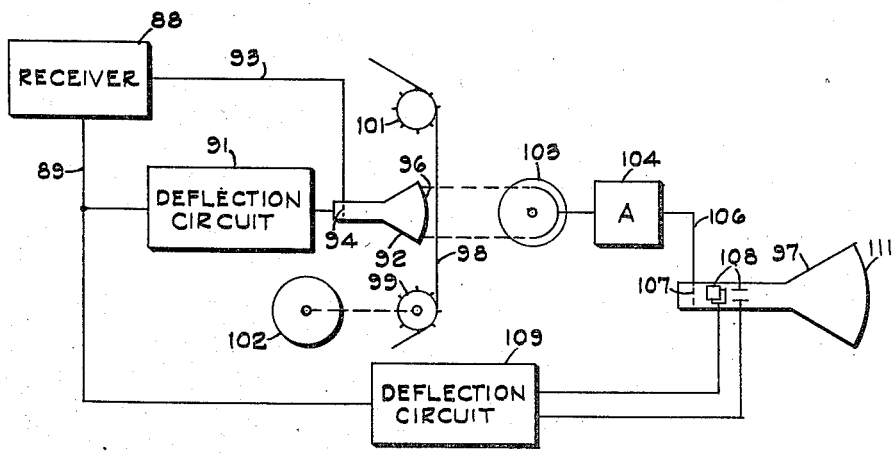
Figure 3 is a schematic illustration of a second embodiment of the invention.

Fig. 3 represents an embodiment of the invention employing television type input signals. From a television receiver 88 there is brought a conductor 89 connected to an output terminal of the synchronizing signal separation circuit of the receiver and carrying the combined vertical and horizontal synchronization signal thereon, consisting of pulses of standard characteristics, including presently vertical synchronizing pulses of a frequency of 60 cycles per second and horizontal pulses of a frequency of 15,750 cycles per second. The combination synchronizing signal is applied to a deflection circuit 91 producing therefrom the sawtooth or other shape of deflecting potentials suitable for excitation of a small electrostatically deflected cathode ray tube 92 having a very short persistence screen. Another conductor 93 is connected from the output terminal of the video amplifier section of the television receiver 88 to the intensifying electrode 94 of the cathode ray tube 92. These conventional connections enable a video picture to be produced on the screen 96 of the tube 92.

It is desired to cause the matter appearing on the screen 96 to appear on the screen of a second cathode ray tube 97, but with other matter added or with matter removed. Consequently there is placed or drawn before the face of the screen 96 a strip of transparent tape 98 the width of the diameter of the screen 96. This tape carries opaque portions which form a written message, and two sprocket wheels 99 and 101 are provided to guide the tape across the face of the screen 96. The sprocket wheel 99 is rotated at a slow speed by the motor 102 through suitable gearing, although it may alternatively be manually rotated. The tape is thus drawn slowly across the beam of light that emanates from the luminous elements of the television picture on the screen 96. Although the mask 98 is chosen in this example to be a moving transparent strip bearing a message in opaque characters, it may instead be opaque with transparent characters, may be stationary or moving, may be fixed directly to the face of the screen 96, or may have any other form for adding a message or image to the video picture or for masking a portion of the picture. In addition, the mask may produce tones or gradations of portions of the video pictures visible through it.

A phototube is placed so that it is actuated by light emitted by the screen 96 and transmitted through the mask 98. The output of this phototube consists of successively varied potential levels corresponding to the chronologically illuminated elemental areas of the screen 96 as masked or modulated by the strip 98. This output potential is amplified in the amplifier 104 and applied through a conductor 106 to the intensifying electrode 107 of a display cathode ray tube 97. The horizontal and vertical deflecting elements 108 of this tube, which may be electromagnetic or electrostatic, but which are chosen for illustration as electrostatic, are provided with sweep voltage by a deflection circuit 109 which may be the deflection circuit 91, may be identical therewith, or may be suitably different in accordance with the design requirements of the tube 97, but in any case the same composite synchronizing signals are applied to the deflection circuit 109 as are applied to the deflection circuit 91, to the end that when the intensification electrode 107 is fully actuated the same video picture or portions thereof will appear on the screen 111 of the tube 97 as appears on the screen 96, except as modulated or modified by the mask 98. In the chosen example the opaque characters of the tape 98 appear black on the screen 111 against the luminous background of the television picture, and the television picture is seen with a message added thereto.

I claim:

1. A visual signal translator comprising, first and second cathode ray tubes each having intensifying electrodes and deflection circuits, means for energizing each of said deflection circuits from a common signal source, means for impressing video signals on the intensifying electrodes of said first cathode ray tube and means for energizing the intensifying electrodes of said second cathode ray tube by selected portions of the illuminated images depicted on the screen of said first cathode ray tube.

2. A visual signal translator comprising, first and second cathode ray tubes each having intensifying electrodes and deflection circuits, means for energizing each of said deflection circuits from a common signal source, means for impressing video signals on the intensifying electrodes of said first cathode ray tube, means including a photocell circuit for selectively energizing the intensifying electrodes of said second cathode ray tube by selected portions of the illuminated image displayed on the screen of said first cathode ray tube.

3. A visual signal translator comprising, a first cathode ray tube having intensifying electrodes and a deflection circuit, a source of video signals connected to and energizing said intensifying electrodes, a second cathode ray tube having intensifying electrodes and a deflection circuit, a common signal source connected to the deflection circuits of each of said first and second cathode ray tubes, a photocell positioned to be illuminated by the light images displayed on the screen of said first cathode ray tube, means interposed between said cathode ray tube screen and said photocell for inhibiting illumination of said photocell by a portion of the light image displayed on said cathode ray tube screen and circuit means energized by the output of said photocell for applying intensifying potentials to the intensifying electrodes of said second cathode ray tube.

4. A visual signal translator comprising first and second cathode ray tubes each having intensifying and deflection circuits, a single source of signals connected to each of said deflection circuits, a source of video signals connected to the intensifying electrodes of said first cathode ray tube, a photocell positioned to be illuminated by light images displayed on the screen of said first cathode ray tube, a member having transparent and opaque portions positioned closely adjacent the screen of said first cathode ray tube and between said cathode ray tube screen and said photocell whereby certain portions of the light image displayed on said cathode ray tube screen are prevented from being projected on said photocell and circuit means energized by the output of said photocell for applying intensifying potentials to the intensifying electrodes of said second cathode ray tube.

5. A visual signal translator comprising, first and second cathode ray tubes each having intensifying electrodes and deflection circuits, a television receiver including a synchronizing signal separation circuit, circuit means for impressing the signals derived from said synchronizing signal separation circuit on each of said deflection circuits, a circuit impressing the video signal output of said television receiver on the intensifying electrodes of said first cathode ray tube, a photocell positioned to be illuminated by the light images displayed on the screen of said first cathode ray tube, a transparent member bearing opaque indicia positioned between said cathode ray tube screen and said photocell whereby those portions of the light image corresponding to the opaque indicia are prevented from impinging on said photocell, and circuit means energized by the output of said photocell for applying intensifying potentials to the intensifying electrodes of said second cathode ray tube.

6. A visual signal translator comprising, first and second cathode ray tubes each having intensifying electrodes and deflection circuits, a television receiver including a synchronizing signal separation circuit, circuit means for impressing the signals derived from said synchronizing signal separation circuit on each of said deflection circuits, a circuit for impressing the video signal output of said television receiver on the intensifying electrodes of said first cathode ray tube, a photocell positioned to be illuminated only by the light images displayed on the screen of said first cathode ray tube, a transparent tape bearing opaque indicia positioned between said cathode tube screen and said photocell, means for advancing said tape and circuit means energized by the output of said photocell for applying intensifying potentials to the intensifying electrodes of said second cathode ray tube.

7. A radar scan simulator comprising, first and second cathode ray tubes each having intensifying electrodes and deflection circuits, a single source of deflection signals connected to each of said deflection circuits, a source of video signals representative of radar targets connected to the intensifying electrodes of said first cathode ray tube, a photocell positioned to be illuminated by the light images representative of said radar targets displayed on the screen of said first cathode ray tube, an opaque rotating disc having a transparent portion positioned between said cathode ray tube screen and said photocell whereby at any instant of time said photocell is illuminated only by light images displayed on said cathode ray tube screen which are opposite the transparent portion of said disc, and circuit means energized by the output of said photocell for applying intensifying potentials to the intensifying electrodes of said second cathode ray tube.

8. A radar scan simulator comprising, first and second cathode ray tubes each having intensifying electrodes and deflection circuits, a single source of deflection signals connected to each of said deflection circuits, a source of video signals representative of radar targets connected to the intensifying electrodes of said first cathode ray tube, a photocell positioned to be illuminated by the light images representative of said radar targets displayed on the screen of said first cathode ray tube, an opaque rotating disc having a transparent sector positioned between said cathode ray tube screen and said photocell whereby at any instant of time said photocell is illuminated only by light images displayed on said cathode ray tube screen which are opposite said transparent sector of said disc, circuit means energized by the output of said photocell for applying intensifying potentials to the intensifying electrodes of said second cathode ray tube, a rotating transparent cursor disc positioned in front of the screen of said second cathode ray tube, said cursor disc having a radial indicium inscribed thereon and means for rotating said cursor disc and said opaque disc in synchronism and for maintaining said radial indicium in phase relation to the transparent sector of said opaque disc.

EVERETT B. HALES.

REFERENCES CITED

The following references are of record in the file of this patent:

UNITED STATES PATENTS

| Number | Name | Date |
|---|---|---|
| 2,269,226 | Rohats | Jan. 6, 1942 |
| 2,407,000 | Evans | Sept. 3, 1946 |
| 2,412,669 | Bedford | Dec. 17, 1946 |
| 2,412,670 | Epstein | Dec. 17, 1946 |
| 2,460,471 | Schade | Feb. 1, 1949 |